United States Patent Office 3,480,458
Patented Nov. 25, 1969

3,480,458
METHOD OF PRODUCING LIGHT-CONDUCTING SYSTEMS
Helmut Dislich, Mainz-Gonsenheim, and Alfred Jacobsen, Mainz-Mombach, Germany, assignors to JENAer Glaswerk Schott & Gen., Mainz, Germany, a corporation of Germany
No Drawing. Filed June 24, 1966, Ser. No. 560,084
Claims priority, application Germany, July 7, 1965, J 28,534
Int. Cl. C03c 25/02
U.S. Cl. 117—8      3 Claims

ABSTRACT OF THE DISCLOSURE

A method of producing light conducting systems comprising the coating of rods and bundles of fibers made of glass, which is permeable to ultraviolet light, with a hardenable polysiloxane whose index of refraction is lower than that of the glass to be coated.

---

The invention relates to a method for producing systems, which conduct ultraviolet light in straight or curved paths.

It is known to employ rigid and flexible bundles of optically insulated fibers for the conveyance of visible light. These fibers consist of a core of an excellently light permeable material, such as glass, whose index of refraction is higher than that of the material of a sleeve or jacket which encases the core and is likewise made of a light permeable material, principally glass. The light passing through this system undergoes on the boundary surface between the core and sleeve a total reflection free of any loss and is conveyed in zig-zag form along the fiber. The aperture angle $2\alpha_0$ of such a light-conductor follows the equation:

$$n_0 \cdot \sin \alpha_0 = \sqrt{n_1^2 - n_2^2}$$

wherein $n_0$, $n_1$ and $n_2$ signify the refractive value of the surrounding medium of the core and of the sleeve. The greater the difference in the refractive value of core and sleeve, the greater is the aperture angle. For the conveyance of visible and near infra-red light these systems are of excellent quality.

If it is now desired to convey ultraviolet light, then the core glass must have a high ultraviolet transparency or permeability since the conveyor paths as a rule are long. Quartz glass is recommended as core glass having the best ultraviolet permeability. There have already been used non-sleeved quartz glass bars and fibers on whose smooth surface (the boundary surface is formed between the quartz or glass surface and air) likewise a total reflection may take place. Often, however, difficulties are encountered with the mechanical mounting of these bars as each optical contact of the outer sleeve surface with another material (for example putty) interferes with the total reflection and gives rise to diffusion and loss of light.

A further possibility consists therein that through a metallic mirror coating on the quartz glass an optical insulation is attained. The reflection on a metallic mirror layer is, however, not without loss, so that particularly with the countless reflections in flexible fibers, high light losses do occur. Additionally, frequently the metal mirror layer becomes separated from the core material upon use.

It is also not possible to fuse onto a quartz glass core a still lower refracting glass, because on one hand a sufficiently low refracting glass, apart from the fully unsuitable fluorine glasses, does not exist, and on the other hand, because it would not be fusible on account of the great difference in the coefficients of expansion.

The method in accordance with the invention permits the use of the excellent quartz glass with respect to its ultraviolet-light permeability, in spite of its low refraction index. In accordance with the invention, quartz glass bars or fibers are coated with a polysiloxane, which has a lower refraction value than the quartz glass. Preferably, the quartz glass is coated with a solution of the polysiloxane and the solvent is evaporated, whereby a lower refracting film remains. Preferably, a hardenable polysiloxane is used, which after the removal of the solvent by means of a temperature treatment employing polycondensation, polyaddition or polymerization operations is hardened or cured to a cross-linked film, for example the product sold under the designation O-I-Glass-Resin Type 650 of Owens, Ill., which is the hardened or cured condition shows a lower refraction value than quartz glass.

If the method is used according to the invention for the production of light-conducting bars for conveying light energy along straight or only slightly curved paths, then the complete coating of the bars, with exception of the end surfaces, with a hardened polysiloxane is of advantage.

If the method according to the invention is used for the production of flexible light-conducting fiber bundles with quartz glass as core of the fibers, then one may proceed in the same manner. It is in this case, however, possible within the framework of the invention to solely coat the two ends of the quartz glass fiber bundle with a polysiloxane, which has a refractory value lower than quartz glass and to cement the same by hardening. In the central flexible part the fibers are surrounded by air, which takes over the role of a sleeve made of a material having a lower index of refraction than that of the fibers. Upon contacting of fibers indeed light energy may pass from one fiber into the other, which, however, is meaningless for a light conduction. A disadvantage of this device may, however, lie in strong mechanical stress to which the quartz glass fiber surfaces are subjected by means of friction. Ordinary smoothening agents, which counteract this friction, cause light diffusion and losses of light on account of a too high refraction. If, however, there is utilized within the frame of this invention as smoothening agent having a lower index of refraction than that of the fibers, such as a polysiloxane, which adheres either in the thinnest layer to the quartz glass fibers, for example the product of hydrolysis of the dimethyldichlorosilane or a non-hardening methylpolysiloxane oil, then the latter works against the destruction of the quartz glass surfaces. Thus, the smoothening agent may work as optically insulating sleeve, if its thickness amounts to twice or three times the length of the light waves used, however, this is not urgently necessary.

The method according to the invention has additional advantages for the conveyance of visible light. If one uses in place of the quartz a glass having a high index of refraction as a core, then one obtains in combination with a sleeve consisting of polysiloxanes which has a lower index of refraction than the glass, a light-conducting system having extraordinarily large aperture angles.

Example 1

A bar of quartz glass having a length of 100 mm. and a diameter of 11 mm. is carefully defatted and is arranged in an inclined position in a filtering flask, in which a substance comprising a 50% alcoholic solution of a polysiloxane, O-I-Glass-Resin Type 650, is permitted to rise, remains briefly stationary and then is caused to uniformly drop again. There will remain on the bar a uniform film from which the alcohol is removed by a 24-hour heating period at 90° C., followed by a 5-hour heating period at 135° C. which will harden the remaining film. Both ends of the bar are then ground and polished.

The light-conducting bar so produced consists of the quartz glass core and a polysiloxane sleeve and has at a wave length $\lambda=546$ nm. with $n_1=1.460$ and $n_2=1.418$ an aperture angle $2\alpha_0=41°$ and at the wave length $\lambda=365$ nm. with $n_1=1.475$ and $n_2=1.453$ an aperture angle $2\alpha_0=29°$.

Example 2

A glass rod having a refractive value $n=1.620$ at a wave length of 546 nm. is treated as described in Example 1. The light-conducting rod on account of the large difference in refractive value of core, $n_1=1.620$ and sleeve, $n_2=1.418$ at a wave length of 546 nm. has an extraordinarily large aperture angle of $2\alpha_0=103°$.

Example 3

A bundle of loose quartz glass fibers is moistened on both ends with a 50% alcoholic solution of O-I-Glass-Resin Type 650 and is mounted in a metal sleeve in such manner that the ends of the fiber bundle project from the sleeve and then is hardened as described in Example 1. The end surfaces are then ground and optically polished, so that they terminate flush with the ends of the sleeve. If necessary, the flexible part of the bundle of fibers may be covered with a thin film of a non-hardening methyl-polysiloxane oil, by way of example the product sold under the designation "Wacker-Silikon oil AK 350," of the refractory value $n_d=1.403$ or with the hydrolysis product of the dimethyldichlorosilane.

What we claim is:
1. The method of producing light conducting systems, particularly for ultraviolet light, which comprises the steps of coating smooth surfaced elements in the form of rods or fibers made of glass and permeable to ultraviolet light with a hardenable polysiloxane having an index of refraction which is smaller than that of the element to be coated, the coating being applied in at least a few wavelengths thickness, and then grinding and polishing both ends of said elements.
2. The method according to claim 1, in which the elements to be coated when they are in the form of rods or fibers are made of quartz glass.
3. The method according to claim 1, in which said elements comprise a core material consisting of a glass having a refractive index in the order of $n=1.62$.

References Cited

UNITED STATES PATENTS 3,301,648    1/1967    Sheldon _____ 156—296 X

WILLIAM D. MARTIN, Primary Examiner

D. COHEN, Assistant Examiner

U.S. Cl. X.R.

117—124, 126